April 30, 1957     W. E. BERGMAN     2,790,724
HYDRAULIC NATURAL CEMENTS HAVING AN EXTENDED THICKENING TIME
Filed Nov. 16, 1953     3 Sheets-Sheet 1

INVENTOR.
W. E. BERGMAN
BY Hudson & Young
ATTORNEYS

INVENTOR.
W. E. BERGMAN
BY Hudson & Young
ATTORNEYS

2,790,724

HYDRAULIC NATURAL CEMENTS HAVING AN EXTENDED THICKENING TIME

William E. Bergman, Bartlesville, Okla., assignor to Phillips Petroleum Company, a corporation of Delaware Application November 16, 1953, Serial No. 392,355

10 Claims. (Cl. 106—90)

---

This invention relates to cements having retarded rates of hydration or set, to slurries of such cement, and to the method of making these slurries. The cement with with the invention is concerned is preferably a Portland or Portland-type cement. In another aspect it relates to any hydraulic natural cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of an additive or agent selected from the group of copolymers of unsaturated compounds known as consisting of polyalkylenesuccinic anhydrides, polyalkoxyalkylenesuccinic anhydrides, and the acids, esters, thio esters, amides and salts derived from said anhydrides, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled.

In order to avoid reciting all members of the group given in the last sentence every time the additive or agent is mentioned, they will be referred to as "said named agents" in all places except in one place where full chemical explanation will be given.

Among the objects of the invention is the provision of a cement having a retarded rate of hydration, or retarded set, as it will be hereinafter termed, particularly at elevated temperatures up to and above 300° F. and/or at high pressures up to and above 20,000 pounds per square inch, such as are encountered in cementing of deep wells.

One object of the present invention is to provide a suitable hydraulic natural cement aqueous slurry, and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic natural cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic natural cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic natural cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceeds to continue drilling the well bore, or to perforate the casing and/or cement with the usual gun perforating tools known to the art. All types of said named agents have sufficient set retarding and thickening time extending properties when added to hydraulic natural cement aqueous slurries to be used commercially in the practice of the present invention. A secondary effect is achieved, which is also of considerable value in cementing oil wells, namely, the aqueous cement slurry containing the minor but effective amount of one of said named agents has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations will absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown liquid, water, or drilling mud, which is forced ahead of the aqueous hydraulic natural cement slurry into the formation to split the same and enlarged the fractures or cracks to be filled, because if ordinary hydraulic natural cement aqueous slurry were employed it would lose water to the formation or foundation so rapidly that the cement slurry would start to set before much penetration has been effected. When a relatively low water-loss hydraulic natural cement aqueous slurry is employed, the amount of breakdown liquid can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure-made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

Figure 1:
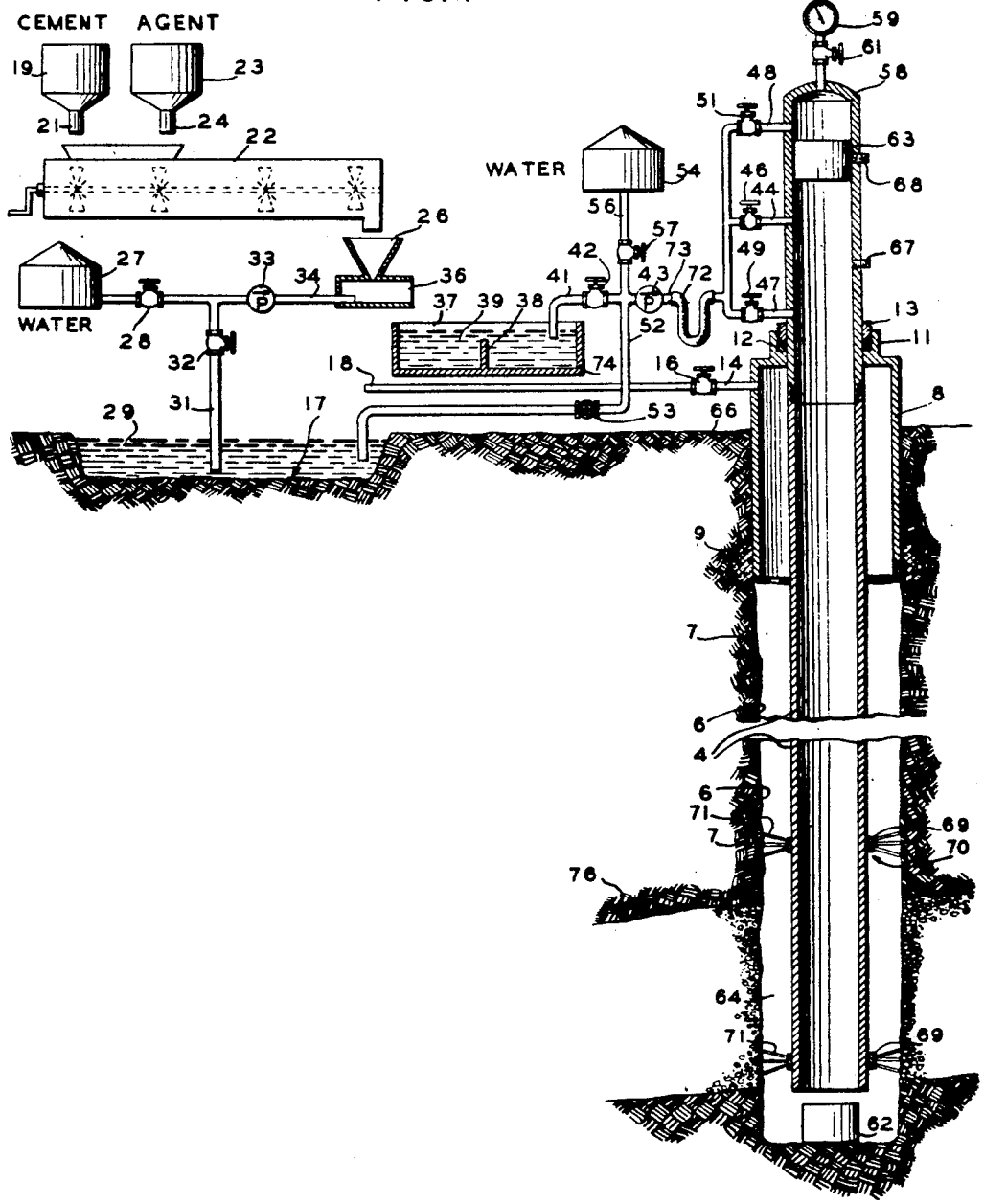
Figure 1 is an elevational view with parts in section of apparatus suitable to carry out the processes of the present invention is compounding the hydraulic natural cement aqueous slurry and cementing a casing in a well, or grouting a formation.

Figure 1 illustrates some of the processes devised by the present invention for cementing a casing 4 in a well 6 drilled in formation 7, or for grouting cracks or crevices in formation 7, it being understood that formation 7, instead of being a natural geological formation, may be a man-made formation such as a foundation, dam, breakwater, or other concrete or masonry structure. While casing 4 could be placed in the open bore 6 of the well, and the circulated drilling mud, hydraulic natural cement aqueous slurry, or other fluids in the bore 6 could be allowed to emerge around pipe 4 onto the surface of the formation 7 from the uncased bore 6, it is preferred to have at least one casing, soil pipe, or other pipe 8 secured in sealing contact with formation 7, either by lose fit or by previous cementing 9. The pipe 8 is provided with a casing head 11 having a stuffing box or packing 12 forced into sealing contact with casing 4 by some sort of follower 13. Casing head 11 also is provided with an outlet pipe 14 which is preferably controlled by a valve 16 and which may discharge into a mud pit generally designated as 17 through pipe 18.

A suitable amount of a suitable grade of hydraulic natural cement, such as Portland cement, is fed from bin 19 through valve 21 into mixer 22 and a minor but effective amount of one or more of said named agents, say from 0.30 to 5 percent by weight of the dry hydraulic natural cement, for example, 0.5 percent by weight, is also fed into mixer 22 from the bin 23 controlled by valve 24. Of course this mixing in mixer 22 need not occur anywhere near the well, but could have taken place any number of miles away and several months before, and then the ready-mixed cement composition brought to the well in sacks (not shown) or in a bulk cement truck (not shown). In any event the dry cement composition from mixer 22, or from cement sacks (not shown), is dumped into hopper 26 where it is picked up and mixed with a jet of water from tank 27 controlled by valve 28, or with a jet of drilling mud 29 from mud pit 17 through pipe 31 controlled by valve 32, the selected liquid being forced by pump 33 through jet pipe 34. The jet of liquid from 34 picks up and mixes with the dry cement from hopper 26 and discharges the same out opening 36, which could connect directly to casing 4. To insure thorough mixing, allow for inspection, and act as a surge reservoir, a suitable reservoir 37 is generally provided and I have found it useful to have a baffle in the same, over which the hydraulic natural cement aqueous slurry flows, and is then picked up by pipe 41 controlled by valve 42 from which it may be pumped by pump 43 into casing 4 through pipe 44 controlled by valve 46. Pipes 47 and 48 controlled by valves 49 and 51 respectively, are both reserved for drilling mud 29 from mud pit 17, drawn through pipe 52 controlled by valve 53 when desired, or water from tank 54 drawn through pipe 56 controlled by valve 57 when desired.

Casing 4 obviously generally consists of a number of pipes screwed together to form a single pipe and at its upper end it is provided with some type of casing head 58. While not essential, it is useful to have a pressure gauge 59 connected at some point in the system. The pressure gauge can be cut off by valve 61.

While casing 4 could be cemented without the use of plugs 62 and 63 simply by opening valves 16, 42, and 49, and pumping the hydraulic natural cement aqueous slurry with pump 43 down inside of casing 4, out the end thereof and up around the annular space 64 between bore 6 and casing 4 on to the ground surface 66 around casing 4 (if no soil pipe 8 is employed) this would not produce the best type of cementing available as the interior of the casing 4 would be full of cement which would have to be drilled out, and no pump pressure could be placed on the slurry. Whether soil pipe 8 is present for pressure control or not, it is possible, when desired in the process, to close valve 42 and open either valve 53 or 57 and follow the cement with water 54 or drilling mud 29, and by counting the strokes of the pump and stopping the same and closing valve 49 at the proper time to stop the cement water interface before the drilling mud or water comes out the bottom of casing 4, and thus cement without plugs 62 and 63 and still have casing 4 almost free of cement. By providing soil pipe 8, casing head 11, flow line 18, valve 16 and casing head 58, it is easy to place pressure on the slurry by throttling or closing valve 16 when desired.

The two plug method illustrated, however, is preferred. Starting with plugs 62 secured in casing head 58 between pipes 44 and 47 by set screw 67 and plug 63 held as shown with set screws 68 and all of valves 42, 53, 57, 51, 46, 49 and 16 closed, it is usual to first wash the annular space 64 of well bore 6 with either drilling mud 29 or water 54, in most cases drilling mud 29 being preferred, and to do so valve 53 and 57 is opened, depending on whether drilling mud 29 or water is used, valve 16 is opened and valve 49 is opened and pump 43 is started, pumping the drilling mud (or water) through casing 4 up through annular space 64 and out through pipe 18. At the same time casing 4 may be moved up and down through stuffing box 11, packing 12 being loosened by loosening follower 13, and casing 4 may, if desired, have secured thereto wall scraper elements generally designated as 70 which may comprise annular rings 69 secured to casing 4, mounting more or less radial wire bristles, rods or strips 71 which scrape the drilling mud cake off the walls of well bore 6 in order to provide a good bond between the formation 7, the well, and casing 4. Any number of scrapers 69 may be provided and the movement of casing 4 may be great enough so that the scraping of one set of scrapers 69 will overlap the scraping of the next adjacent set, and to allow this movement a flexible section of pipe 72 may be provided in the line 73 from pump 43.

When the washing of the well and cleaning of the wells is sufficiently accomplished, pump 43 is stopped, and whichever of valves 53 and 57 are opened is closed. The casing 4 at that time is spaced from the bottom of the hole 6 a distance less than the length of plug 62 plus a portion of the length of plug 63 but greater than the length of plug 62. Follower 13 of stuffing box 11 is adjusted to seal at 12 around casing 4. Valves 16, 42 and 46 are open and set screw 67 is screwed away, releasing plug 62, and pump 43 is started, pumping hydraulic cement aqueous slurry from sump 74 of reservoir 37 into the space between plugs 62 and 63, forcing plug 62 down casing 4 and out the end thereof into the position shown. The cement forces the plug out the end of casing 4 and proceeds up the annulus 64 forcing the mud or water ahead of it up annulus 64 and in doing so it may have to traverse an especially porous formation 76 which will take the water away from the aqueous slurry in the absence of said named agent 23, especially if the drilling mud has been scraped from the surface of formation 76 by the scrapers 71. When the hydraulic natural cement aqueous slurry commences emerging from pipe 18, or when it is believed that it would emerge from pipe 18 or would reach the desired elevation in annulus 64 as soon as casing 4 was cleared of cement, depending on the type of cementing job desired, then valve 51 and one of valves 53 or 57 are opened, set screw 68 is loosened, and valves 42 and 46 are closed, whereupon the water (or drilling mud) passes through pipe 48 into casing head 58, moving plug 63 down the casing 4 until plug 63 rests on top of plug 62 but is unable to come out of the bottom of the casing and therefore plugs the end of casing 4, whereupon the pressure (as indicated by gauge 59) goes up as an indication of what has happened, valve 51 is closed and pump 43 shut down, leaving the annular space 64 full of cement and the inside of casing 4 full of water or drilling mud.

Any time during the entire pumping process from the time the cement reaches 76 until plug 63 seats on plug 62 that it is desired to drive the hydraulic cement aqueous slurry into the more porous portions of the formation, such as formation 76, it is only necessary to throttle pipe 18 by partially closing valve 16, or, if desired, to close valve 16 completely for the desired time, which action will send up the pressure in the system to the desired degree and force cement slurry into formation 76 if it will take the same at the pressure.

The U. S. patents now in class 166, Wells, subclass 22, Cementing or Plugging, disclose a number of other suitable cementing processes which may be employed in my invention.

Figure 2:
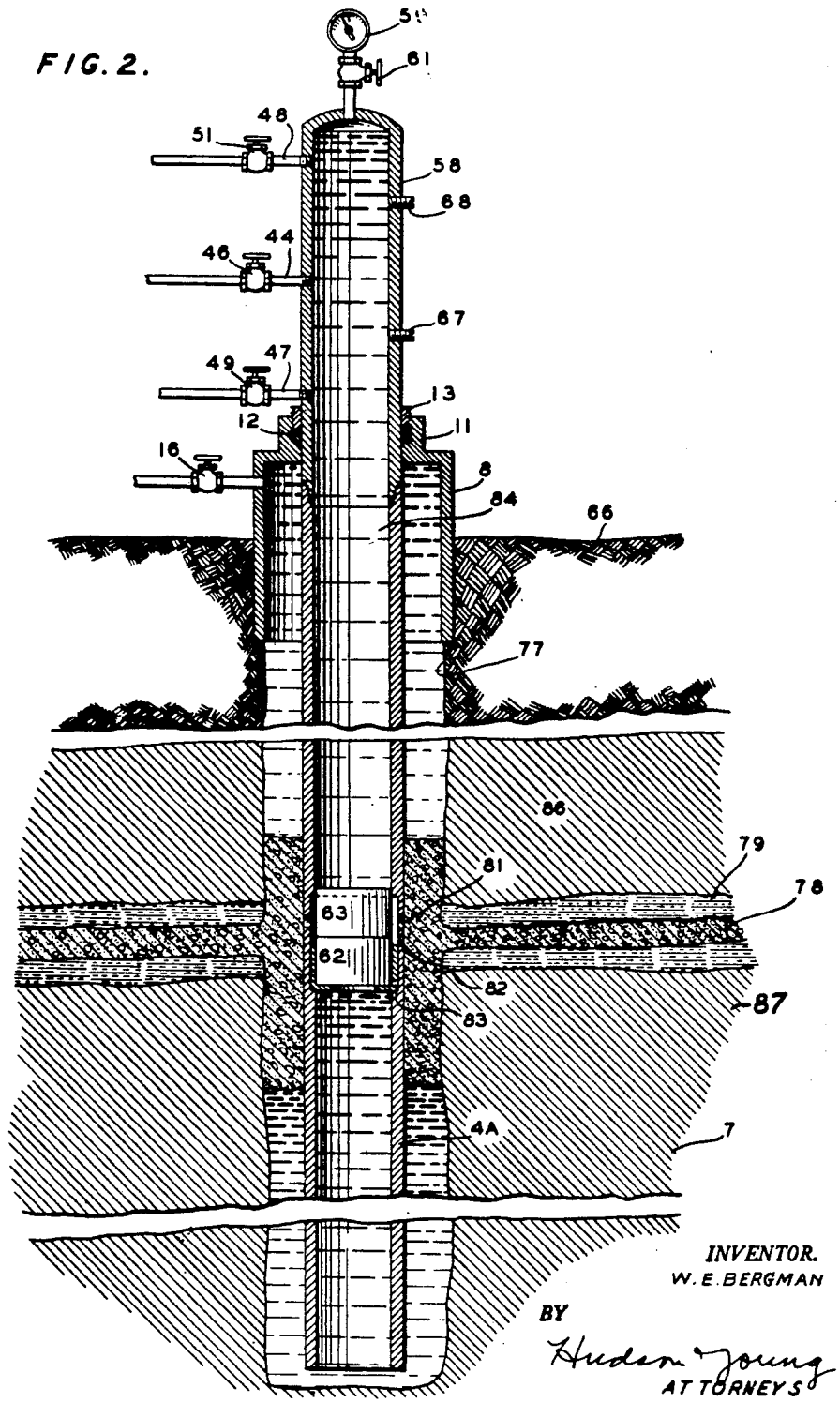
Figure 2 is a cross sectional view of a portion of a well in which squeeze cementing is being employed to place a cementitious horizontal dam out into the surrounding formation.

Figure 2 is illustrative of a well 77 similar to well 6 and equipped with similar equipment in which a squeeze-cementing job is employed to place a cementitious horizontal dam 78 out into the surrounding formation 79. As will be noted by the use of similar numbers, the equipment at the top of the well is all the same as in Figure 1 and is operated in the same manner. Casing 4A differs from casing 4 somewhat, in that the intermediate portion of casing 4A is provided with a number of radial holes 81 which holes are at first covered by sleeve 83 held in place by frangible pin 82. When plug 62 comes down the casing 4A ahead of the cement it catches in sleeve 83, breaks frangible pin 82 and opens openings 81 to cement. This causes a jump of the indicator needle of gauge 59 and at that time valve 16 can be closed for as long a period of time as desired so that cement 78 can be forced away out into formation 79. When plug 63, which is followed by liquid 84 which may be water 54 or drilling mud 29, reaches the top of plug 62 it plugs the interior of casing 4A, closing the holes 81. Incidentally, in both Figures 1 and 2, plugs 62 and 63 are preferably made of wood, or some easily drillable plastic composition, and preferably sleeve 83 is made of some drillable material, such as aluminum or magnesium, so that after cement dike 78 has set, the casing 4A can be drilled out to its original diameter and drilling or other desired operations carried out through the same.

In Figure 2 the formations 86 and 87 may be more impervious than formation 79, and the crack into which cement 78 is forced may have originally been formed by the pressure on the aqueous slurry of pump 43 with valve 16 closed, in which case formation 86 and all overlying formations are raised or compressed enough to make room for cement 78. These formations 86, 87 and 79 may all be man-made, such as layers of earth, concrete or masonry, as in a big dam or other foundation.

Figure 3:
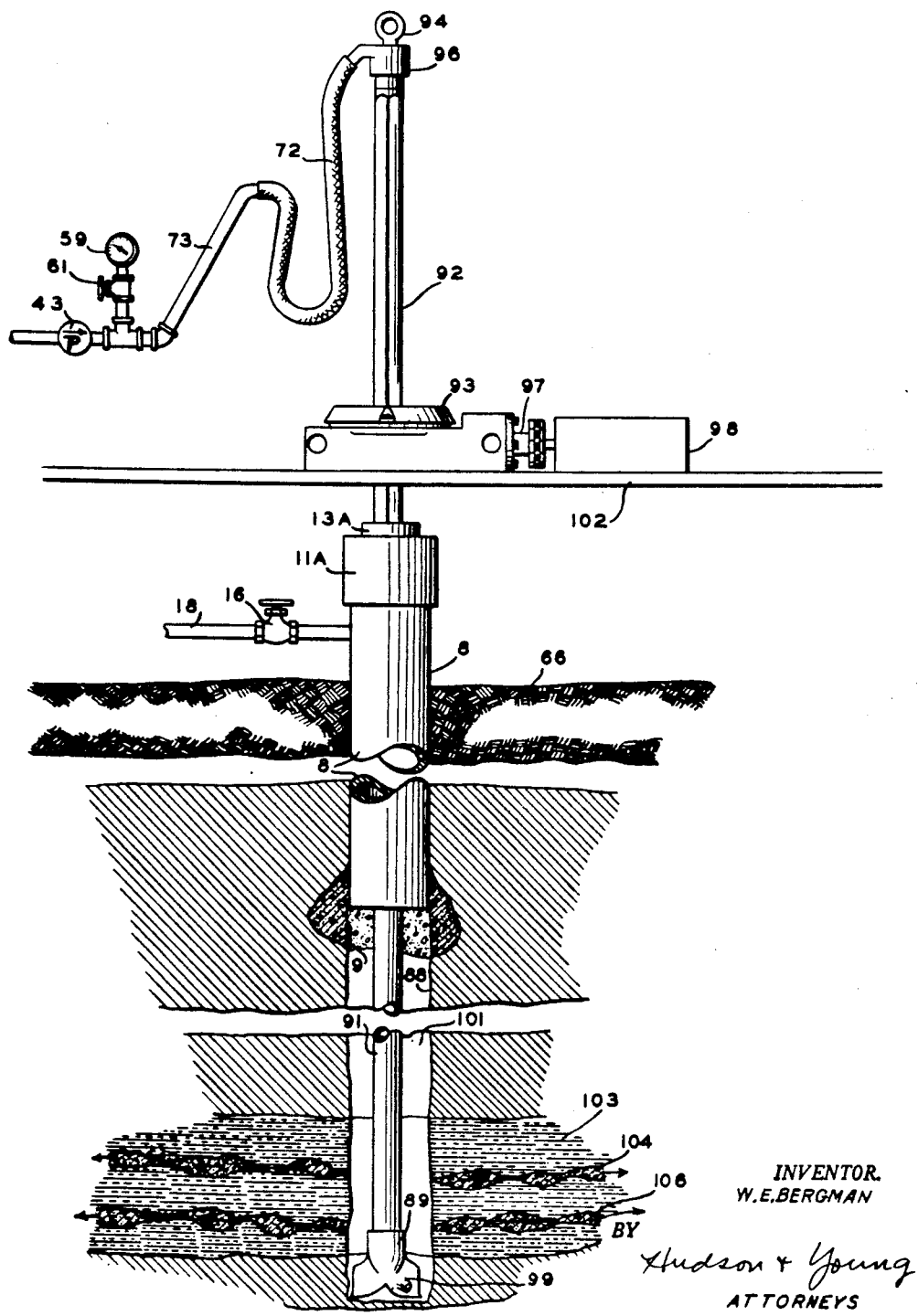
Figure 3 is a cross sectional view of a portion of a well in which a porous formation is plugged to prevent loss of circulation while drilling.

In Figure 3 is illustrated rotary drilling operations in which a well 88 is being drilled with a fishtail bit 89 rotated at the end of a drill string 91. Drill string 91 has a square section 92 known as a kelly which is slideably and rotatably engaged with a square hole or bushing in rotary table 93, the drill bit being supported from eye 94 of rotary swivel 96 by means of a hoisting tackle (not shown) and rotary table 93 is rotated through gear 97 driven by motor 98. At the same time pump 43 is pumping drilling mud 29 (see Figure 1) through pipe 73, flexible section 72 and rotary swivel 96 down the inside of kelly 92 and drill string 91 and out of the jet hole of bit 89, returning through annular space 101 through soil pipe 8, valve 16 and pipe 18 into mud pit 17. Soil pipe 8 is provided with a stuffing box 11A, which because the kelly is square has to have a rotatable portion 13A slideably packing against the square sides of kelly 92. Such equipment is well known in the art of drilling wells, as shown by U. S. patents in class 166, Wells, subclass 15, Controllers; and class 255, Earth Boring, subclass 19A, Rotary, Blowout Preventers.

Motor 98 and rotary table 93 are supported by floor 102 of the usual rotary well drilling rig, the remainder of which drilling rig is not shown but is well known to those skilled in the art.

When rotary drilling, sometimes a cavernous formation 103 is encountered, containing passages 104 and 106, which may have an apparently unlimited capacity for taking up drilling mud in the direction shown by the arrows. When such a formation is encountered, instead of directing ordinary drilling mud 29 in through pipe 52 and pumping the same down drill string 91 with pump 43, valve 53 is closed (see Figure 1) and valve 32 is opened, pump 33 is started, valve 28 being closed, and drilling mud is jetted through 34 and mixed with hydraulic natural cement containing one of said named agents which is discharged as a hydraulic natural cement aqueous mud containing slurry into 39 from which it is picked up by pipe 41, valve 42 being open, and valves 53 and 57 closed, by pump 43 and pumped down drill string 91. At this time valve 16 may be closed to increase the pressure forcing the slurry back into caverns 104 and 106, but closing valve 16 may be unnecessary if caverns 104 and 106 are already taking the drilling mud completely. Whenever the operator, because of rising pressure or the returning of slurries through pipe 18, decides that caverns 104 and 106 are shut off and circulation has been restored, valve 42 is closed and valve 53 is opened, valve 16 now being opened, and the rotary drilling continues in the usual manner with drilling mud 39 from mud pit 17 washing the remains of the cement containing mud out of bore 101 and pipe 18. Obviously the pump 33 is shut down as soon as slurry 29 is no longer needed, and pipe 18 can be deflected to another mud pit or dumping place (not shown) to avoid the cementitious mud returning to mud pit 17, until cement free mud returns, and then it can be deflected back to mud pit 17. These formations being drilled may be man-made as in a dam, or may be natural formations encountered as in oil well drilling.

By hydraulic natural cement this invention tends to include all mixtures of lime, silica, and alumina, or of lime and magnesia, silica and alumina and iron oxide (magnesia for example may replace part of the lime, and iron oxide a part of the alumina), as are commonly known as hydraulic natural cements. Hydraulic natural cements include hydraulic limes, grappier cements, pozzolan cements, natural cements, calcium sulfate or gypsum cements (such as Plaster of Paris) and Portland cements. Pozzolan cements include slag cements made from slaked lime and granulated blast furnace slag. Because of its superior strength Portland cement is preferred among the hydraulic natural cements, but as the art of cements recognizes hydraulic natural cements as a definite class, and as results of value may be obtained with one of said named agents with any member of that class, it is desired to claim all hydraulic natural cements. In addition to the ordinary construction grades of Portland cement or other hydraulic natural cements, modified hydraulic natural cements and Portland cements designated as high-early-strength cement, heat-resistant cement, and slow-setting cement may be used in the present invention. The "Condensed Chemical Dictionary" 3rd edition, 1942, published by Reinhold Publishing Corporation, New York, N. Y., page 173, column 2, paragraph 4, entitled "Natural cements," shows the preceding definition and classification of hydraulic natural cements is recognized and followed by those skilled in the prior art.

In most oil well cementing and grouting operations it is generally desirable to use neat cement for added strength, but obviously it is always possible to add to the hydraulic natural cement, water, and one of said named agents any desired amount of an inert granular filling material or aggregate such as sand, ground limestone, diatomaceous earth (one type being known as "Celite"), or any of the other well known inert or even cementitious aggregates, as long as simple tests show the amount added does not reduce the compressive strength after final set below the desired value. For example, bentonite or other clays are often added to hydraulic natural cement aqueous slurries, as taught by U. S. Patent 2,041,086 of May 19, 1936, or iron oxide or barium sulfate is added to make heavy cement. Any of these aggregates can be added to the aqueous hydraulic natural cement slurry of the present invention in the usual proportions used in the prior art. Bentonite and/or diatomaceous earth is often added to make the cement slurry lighter, and such lighter slurry can be used in the present invention.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to time of set, compressive strength, etc., on samples of the proposed mix. It is preferred to limit the amount of bentonite or other clays to 20% or less, and the amount of "Celite" or other diatomaceous earth to 60% or less, both percentages by weight of the dry cement.

The amount of water added to the cement of the present invention is not critical, it being obvious that sufficient water should be added to form a pumpable slurry, and that when the slurry becomes pumpable no further water need be added. One advantage of the slurry of the present invention when one of said named agents is used is that it is a low water-loss slurry, and therefore it is not necessary to add much excess water over the amount making the slurry pumpable as a reserve for expected losses, which excess water might tend to reduce the final compressive strength of the cement.

It has been found that all hydraulic natural cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from about 0.05 to 5% by weight of the dry hydraulic natural cement of one of the said named agents without seriously affecting the other desirable properties of the cement. It is preferred at present to use the sodium or potassium salts of one of said named agents merely because these salts are readily available commercially and therefore relatively inexpensive. However, good results will be obtained using any other alkali metal salt, such as the lithium, rubidium, caesium and other rare alkali metal salts, or the ammonium or organic base salts of one of said named agents all of which are water soluble. Typical organic base salts that can be used are those derived from ammonia such as methyl amine, dimethyl amine and quaternary ammonium bases; also pyridine, morpholine and the like. In addition the alkaline earth metal salts such as the barium, calcium, strontium and magnesium, and the heavy metal salts such as the aluminum, iron, copper, lead, silver, mercury, nickel, and all other salts of one of said named agents (which are probably insoluble in water but which hydrolyze in the hydraulic natural cement aqueous slurry which is an aqueous alkaline solution) are useful in this invention in the aqueous hydraulic natural cement slurry which is quite alkaline. Each of said named agents whether such salt is formed in the aqueous hydraulic natural cement slurry by hydrolysis of some water-insoluble salt, are all valuable in amounts of 5 percent or less, based on weight of dry cement, in retarding the set of aqueous hydraulic natural cement slurry, especially at the temperature and pressure encountered in cementing a well, and will decrease the water loss from said aqueous hydraulic natural cement slurry to porous formations encountered in the well.

While 0.05 to 5% of one of said named agents by weight of the dry hydraulic natural cement will give valuable results, it has been found that from 0.30 to 2% is the most preferred range in wells less than 14,000 feet deep and less than 300° F., the use of 0.5% being particularly effective in such wells, and the percentage above 2% being chiefly of value in still deeper and hotter wells, or when aggregate such as diatomaceous earth, bentonite, etc. is employed. It has been found necessary when such aggregates are employed to use more of said agents than in neat Portland cement. This desirable additional amount can be determined by routine tests to measure the desired effect, which can still be obtained with 5% or less of said agent based on the dry Portland, or other hydraulic natural cement.

As stated in the first paragraph of this specification said named agents consist of compounds selected from the group consisting of polyalkylenesuccinic anhydrides, polyalkoxyalkylenesuccinic anhydrides, and the acids, esters, thio esters, amides and salts derived from said anhydrides. Such compounds as composition of matter per se are not the invention of the present inventor, but compositions of matter comprising hydraulic natural cement and such compounds are the novel and patentable invention of the present inventor. The compounds per se can be obtained on the open market from such chemical supply companies as General Aniline and Film Corporation, 22 Center Square, Easton, Pennsylvania, which named company sells some under the trade name "PVM/MA." According to page 1, paragraph 1, of their "New Product Bulletin No. P-103" of January 3, 1951, the trade name "PVM/MA" appears to mean a linear copolymer of alternating methyl vinyl ether and maleic anhydride units, PVM standing for polyvinylmethyl and MA for maleic anhydride, and as such would be also known by the chemical name of polymethoxyethylenesuccinic anhydride, having the formula given at the right hand side of the second formula printed below. These compounds per se are fully described in "Maleic Anhydride Derivatives" by Lawrence H. Flett and William Howlett Gardner, 1952, published by John Wiley and Sons, Inc., New York City, on pages 26 and 27.

As an example of the preparation of one of said polyalkylenesuccinic anhydrides, namely polyethylenesuccinic anhydride, on page 27 of said book, a solution containing 30 g. of maleic anhydride and 1.8 g. of benzoylperoxide in 200 ml. of toluene is heated with ethylene to produce the anhydride. On page 26 it is stated that in general maleyl compounds show a reaction selectivity that favors the formation of the alternating 1:1 type of copolymer. The reaction is represented as follows:

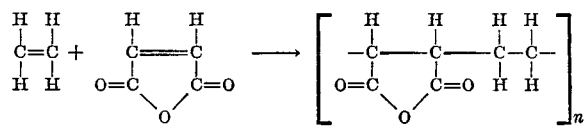

Ethylene + Maleic anhydride → Polyethylenesuccinic anhydride

Alkylvinyl compounds such as propylene and butylene of the general formula $CH_2=CHR$, alkoxyvinyl compounds such as methoxyethylene (better known as methyl vinyl ether) of the general formula $CH_2=CHOR$, and alkoxyvinylalkyl compounds such as methoxypropylene of the general formula $R'CH=CHOR''$ where R, R' and R'' are the same, or different alkyl radicals, may be substituted for the ethyelne in the above equation and will give the corresponding anhydride, which anhydrides, and the acids, esters, thio esters, amides and salts derived from said anhydrides, will all be found to be useful in the present invention for the purposes of increasing the setting time and reducing the water loss to permeable formations of an aqueous hydraulic natural cement slurry. For example:

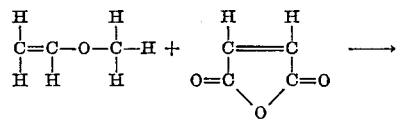

Methyl vinyl ether + Maleic anhydride ——→

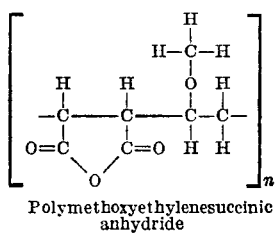

Polymethoxyethylenesuccinic anhydride

In the above formulas the letter $n$ outside the bracket indicates the bracketed unit is repeated many times. The size of $n$ is immaterial, and hard to determine, but is satisfactory when the specific viscosity by the standard test is from about 0.1 to about 10 for a 1 gram per 100 milliliter solution of the anhydride in 2-butanone (ethyl methyl ketone) at 25° C.

The above identified copolymerized anhydrides are solids which dissolve in water and hydrolize to give the polyacid (copolymeric acid). Warming speeds up both reactions, and sufficient warming will occur in a deep well due to the heat in the earth at the depths of cementing. For example, the anhydride formed by the copolymerization of the methyl vinyl ether and maleic anhydride in the last equation above hydrolizes in water to give polymethoxyethylenesuccinic acid, the formula being:

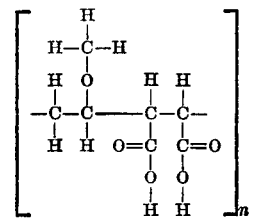

The above identified anhydrides dissolve in alcohols, such as methanol, ethanol, isopropanol, and methyl carbitol. At room temperatures half esters of the copolymer are formed, but with higher temperatures and/or in the presence of any known strong dehydrating or esterifying agent or catalyst of the prior art such as sulfuric acid, the full ester can be obtained. Similar reactions occur between said anhydrides and thio alcohols (mercaptans). As the resulting thio esters will hydrolize to some extent with the hydraulic natural cement to form calcium salts and release the original mercaptan, their use will hardly be popular with drilling crews, but they cannot be said to be inoperative for this reason, as they still give good results so far as the cement is concerned, and gas masks could be employed. However, as drilling crews are noted for objecting to having to work with unpleasant materials, it is probable that the thio esters will not be used much in deep wells.

The general formula for such a half ester with any alcohol is:

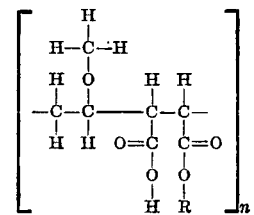

where R is the nucleus of the alcohol molecule, generally an alkyl radical.

As both half esters and full esters are operative in the present invention, and as both are in fact "esters" the term esters in this specification will be defined as covering both, and the same is true with the term thio esters.

With alkalies, other metal hydroxides and the like, represented by MOH, salts are formed by reaction with said acid having the general formula:

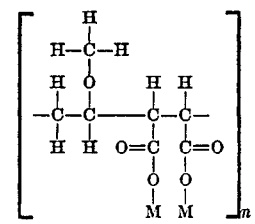

With amines, $R_xNH_m$ where $x+m=3$ and R is an alkyl radical, and with ammonia, $NH_3$, either the quaternary ammonium compounds or the classical amide is formed by reaction with said acid and as both of these hydrolize in hydraulic natural cement aqueous slurries, and as it is not certain which is formed, and as both forms can be called amides, the term "amides" is defined as covering all of these compounds. The formulas are given first with the quaternary form and then with the classical amide form.

With amides; quaternary form:

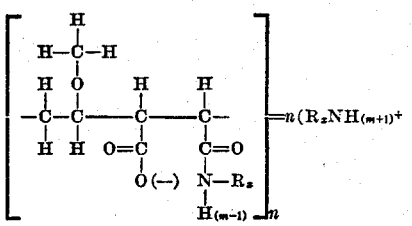

With amides; classical form:

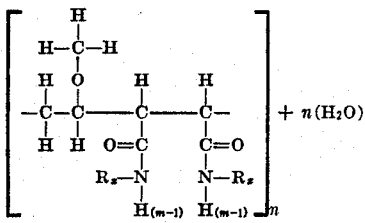

With ammonia, the R's in the above two formulas are replaced by H's.

All the polyalkylenesuccinic anhydrides, all the polyalkoxyalkylenesuccinic anhydrides, and all of their acids, and all of the esters, thio esters, amides and salts of said acids are useful in aqueous hydraulic natural cement slurries in the present invention to increasing the thickening time and time of set, and decrease the water loss to permeable formations, of said slurry, especially when used in amounts of 0.3 to 5 weight percent by weight of the dry cement. However, those having alkyl groups of 4 or less carbon atoms in each alkyl chain are preferred. As these materials all hydrolyze in the aqueous cement slurry the anhydrides, acids, and esters, thio esters, amides and salts of said acids are all substantially equivalent.

It should be understood, however, that these are copolymeric materials and therefore the above formulas are merely representative of some parts of the polymer. For example, as an average an alternating 1:1 type of copolymer is formed, but this is only an average and a number of the same monomers may be connected together in portions of the polymeric chain, also from 80:20 to 20:80 copolymers are still useful in the present invention, and the terms polyalkylenesuccinic and polyalkoxyalkylenesuccinic are hereby defined to cover all variations mentioned in this sentence. Furthermore the number of succinic anhydride groups

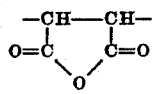

or succinic acid groups

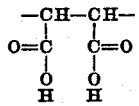

substituted to form said acids, esters, thio esters, amides and salts may vary greatly from 20 to 100% and said copolymers are still useful in this invention, and the terms acids, esters, thio esters, amides and salts are hereby defined to cover such ranges of substitution.

Said agents may also be defined as the copolymer condensation reaction products of vinyl, or vinyl alkyl hydrocarbons (including by definition ethylene), or vinyl alkyl ethers (including by definition methyl vinyl ether) with maleic anhydride, and the acids, esters, thio esters, amides and salts of such reaction products. The vinyl and vinyl alkyl hydrocarbons are also called mono olefins, which includes ethylene.

While it is preferred to have the copolymer condensation reaction take place between the mono olefin, or mono olefin containing ether, and maleic anhydride, maleic acid could be used instead of the anhydride for this reaction with similar results, and therefore should be regarded as an alternative. The reaction with the anhydride is preferred as it proceeds more rapidly and more completely.

With both the maleic anhydride and the maleic acid, when reacted with any mono olefin or vinyl alkyl ether, the tendency is to form a linear alternating 1:1 type of copolymer, but this is not always true, and in all cases considerable variation can be expected to the extent discussed in the second paragraph above.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperature in from one or two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

Another factor is that the aqueous hydraulic natural cement slurry is often pumped into place. While this can be done with greater viscosities, 100 poises is chosen as a safe limit of practical pumpability. The time necessary to reach this viscosity is known as the thickening time, and is related more or less to the time of initial set.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. It is therefore highly desirable that a retarded cement such as mine be available for cementing work.

The most convenient method of using one of said named agents in cement is to run the same and the hydraulic natural cement through a rotary mixer to produce intimate mixing and later add water to form a fluid slurry. However, the material selected from said named agents may be added directly to the cement and water at the time of mixing at the well, or the said material may be dissolved in the water with which the cement is mixed, with substantially the same result. The method of mixing is not critical as long as a somewhat uniform mixture is produced.

The rate of hydration or set of cement is ordinarily increased by an increase in temperature. Since the bottom hole temperature in the well may be considerably higher than the atmospheric temperature, it is desirable that a method such as I have described be available for use in the cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of the one of said named agents temporarily absorbing so much of the water that the Portland cement is only slowly able to obtain enough water to make its initial set, whereby the initial set of the cement is greatly retarded. Finally the Portland cement particles take the water away from said named agent and attain an initial and then a final set with suitable strength in the cement for use in oil well cementing operations.

The prior art United States Patent 2,427,683 of September 23, 1947, to Norman C. Ludwig for "Retarded Cement and Method of Making" teaches that the setting time of an aqueous slurry of hydraulic cement (such as Portland cement and water) used in cementing a well can be retarded for about three hours by adding from 0.5 to 0.75 percent by weight of the dry cement of at least one of the group consisting of carboxymethylcellulose and salts of carboxymethylcellulose and/or hydroxyethylcellulose; acid carboxymethylcellulose, the sodium salts of the same, the alkali metal salts, the ammonium salts and the other metal salts such as the alumina, iron, copper, lead, silver, mercury, nickel and similar salts of carboxymethylcellulose, can all be used because those which are not soluble in water will hydrolyze and become soluble in the hydraulic cement slurry which is always an alkaline aqueous slurry.

The materials suggested by said Ludwig patent are acid carboxymethylcelluloses and salts of the same and/or hydroxyethylcellulose and no one of the below named agents is mentioned because none was known that would be suitable.

*Example I*

As working examples of polyalkylenesuccinic anhydrides and the acids, esters, thio esters, amides and salts derived therefrom, the following will be found of value in practicing the present invention: polyethylenesuccinic anhydride, polyethylenesuccinic acid, methyl polyethylenesuccinate, methyl thio polyethylenesuccinate, polyethylenesuccinic dimethyl amide, polyethylenesuccinic amide, polypropylenesuccinic anhydride, polypropylenesuccinic acid, ethyl polypropylenesuccinate, ethyl thio polypropylenesuccinate, polypropylenesuccinic methyl amide, sodium polyethylenesuccinate, potassium polyethylenesuccinate, calcium polyethylenesuccinate, aluminum polyethylenesuccinate, iron polyethylenesuccinate, and mercury polyethylenesuccinate.

As working examples of polyalkoxyalkylenesuccinic anhydride and the acids, esters, thio esters, amides and salts derived therefrom, the following will be found of value in practicing the present invention: polymethoxyethylenesuccinic anhydride, polymethoxyethylenesuccinic acid, methyl polymethoxyethylenesuccinate, methyl thio polymethoxyethylenesuccinate, polymethoxyethylenesuccinic dimethyl amide, polymethoxyethylenesuccinic amide, polypropoxypropylenesuccinic anhydride, polypropoxypropylenesuccinic acid, ethyl polypropoxypropylenesuccinate, propyl thio polypropoxypropylenesuccinate, polypropoxypropylenesuccinic methyl amide, sodium polymethoxyethylenesuccinate, potassium polymethoxyethylenesuccinate, calcium polymethoxyethylenesuccinate, aluminum polymethoxyethylenesuccinate, iron polymethoxyethylenesuccinate, and lead polymethoxyethylenesuccinate.

Sample A was prepared by mixing 600 grams of dry Portland cement with 0.5% by weight of said cement of the alternating 1:1 type copolymer of methyl vinyl ether and maleic anhydride, named polymethoxyethylenesuccinic anhydride in the list above, adding 320 grams of water, and blending 35 seconds in a Waring blender.

Sample B was prepared exactly the same, but there was no copolymeric additive.

Samples A and B were tested for water-loss according to the procedure set forth in API Code 29 for drilling muds. This test measures the milliliters of filtrate that can be forced through a standard filter paper by a 100 lb./in.$^2$ gage pressure differential in thirty minutes (if not finished sooner), which has been found to be a very good indication of what water would be lost from an aqueous cement slurry to an exposed porous sand formation in an oil well. 20 ml., or less, in 30 minutes is regarded as very good, but larger water losses are not preferred, and over 100 ml. in less than 2 minutes is particularly bad, although usual for ordinary Portland cement aqueous slurries.

The results were that sample A lost only 14 ml. in 30 minutes, while sample B lost 105 ml. in 1 minute 15 seconds, see Table I.

TABLE I

| Run No. | Sample No. | Additive, Percent | Water loss at 100 p. s. i. (ml./min., sec.) | Value for Well Cementing |
|---|---|---|---|---|
| 1 | A | 0.5 | 14/30′ | Valuable. |
| 2 | B | 0 | 105/1′15″ | Poor. |

*Example II*

Sample C was made the same as sample A except that 100 grams of Portland cement was used per 53 grams of water to give a slurry weighing about 15 lbs./gallon. It contained the same proportion of the same additive, 0.5% by weight of the dry cement of polymethoxyethylenesuccinic anhydride.

Sample D was the same as sample C except there was no copolymeric additive.

The thickening time of both samples C and D was measured with a Halliburton thickening time tester at 140° F. according to the procedure described in API Code 32, section XII (9). The viscosity was checked at appropriate intervals of time after 2 hours to allow for mixing. 14 hours and 40 minutes, after the beginning of the mixing, sample C was still pumpable. But sample D, without the polymeric additive, was unpumpable in 2 hours and 26 minutes. This would give a tremendous advantage in placing cement in back of casing in a well where it had to be pumped upwards through a narrow annular space past a considerable area of exposed porous sand or rock formations, and would insure placing the cement (by pumping) much further up along the outside of the casing than could otherwise be done, resulting in sealing off more extensive formations and making a better and more extensive bond between the casing and the well hole formations than ever possible before.

These results are given in Table II.

TABLE II

| Run No. | Sample | Additive Percent | Time after mixing (hours, min.) | Viscosity (poises) |
|---|---|---|---|---|
| 3 | C | 0.5 | 2$^h$ 0′<br>14$^h$ 40′ | 40<br>100 |
| 4 | D | 0 | 2$^h$ 0′<br>2$^h$ 26′ | 80<br>100 |

While numerous examples of the invention have been given, for purposes of illustration, the invention is not limited thereto.

Having described my invention, I claim:

1. A cement capable of forming a fluid slurry when mixed with water, consisting essentially of a hydraulic natural cement mixed with a small proportion by weight of the dry hydraulic cement effective to increase the setting time of a hydraulic natural cement thickening time extending agent selected from the group consisting of polyalkylenesuccinic anhydrides, polyalkoxyalkylenesuccinic anhydrides, and the acids, esters, thio esters, amides and salts of said anhydrides.

2. A hydraulic cement slurry having a retarded setting time, consisting essentially of a hydraulic natural cement, sufficient water to form a pumpable slurry, and a small proportion by weight of the dry hydraulic cement effective to increase the setting time of a hydraulic natural cement thickening time extending agent selected from the group consisting of polyalkylenesuccinic anhydrides, polyalkoxyalkylenesuccinic anhydrides, and the acids, esters, thio esters, amides and salts of said anhydrides.

3. A cement capable of forming a fluid slurry when mixed with water, said cement consisting essentially of Portland cement mixed with a small proportion by weight of the dry hydraulic cement effective to increase the setting time of polymethoxyethylenesuccinic anhydride.

4. A cement capable of forming a fluid slurry when mixed with water, consisting essentially of Portland cement, mixed with a small proportion by dry weight of said Portland cement sufficient to increase the thickening time thereof of a Portland cement thickening time extending agent selected from the group consisting of polyalkylenesuccinic anhydrides, polyalkoxyalkylenesuccinic anhydrides, and the acids, esters, thio esters, amides and salts of said anhydrides.

5. A cement capable of forming a fluid slurry when mixed with water, consisting essentially of Portland cement mixed with a small proportion of 0.05 to 5% by dry weight of said Portland cement sufficient to increase the thickening time thereof of a Portland cement thickening time extending agent selected from the group consisting of polyalkylenesuccinic anhydrides, polyalkoxyalkylenesuccinic anhydrides, and the acids, esters, thio esters, amides and salts of said anhydrides.

6. A hydraulic cement slurry having a retarded setting time, consisting essentially of Portland cement, sufficient water to produce a pumpable slurry, and a small proportion by dry weight of said Portland cement sufficient to increase the thickening time thereof of a Portland cement thickening time extending agent selected from the group consisting of polyalkylenesuccinic anhydrides, polyalkoxyalkylenesuccinic anhydrides, and the acids, esters, thio esters, amides and salts of said anhydrides.

7. A hydraulic cement slurry having a retarded setting time, consisting essentially of a Portland cement, sufficient water to produce a pumpable slurry, and a small proportion of 0.05 to 5% by dry weight of said Portland cement sufficient to increase the thickening time thereof of a Portland cement thickening time extending agent selected from the group consisting of polyalkylenesuccinic anhydrides, polyalkoxyalkylenesuccinic anhydrides, and the acids, esters, thio esters, amides and salts of said anhydrides.

8. A cement capable of forming a fluid slurry when mixed with water, said cement consisting essentially of Portland cement mixed with a small proportion of 0.05 to 5% by weight of the dry hydraulic cement sufficient to increase the thickening time thereof of polymethoxyethylenesuccinic anhydride.

9. A Portland cement slurry consisting essentially of a Portland cement, water and a small proportion of 0.05 to 5% by weight of the dry Portland cement sufficient to increase the thickening time thereof of polymethoxyethylenesuccinic anhydride.

10. A hydraulic cement slurry consisting essentially of Portland cement, water, and a small proportion of 0.05 to 5% by weight of the dry hydraulic cement sufficient to increase the thickening time thereof of sodium polymethoxyethylenesuccinate.

References Cited in the file of this patent

UNITED STATES PATENTS 2,188,767   Cannon et al. _____ Jan. 30, 1940